(12) United States Patent
Singer et al.

(10) Patent No.: US 7,017,040 B2
(45) Date of Patent: Mar. 21, 2006

(54) BIOS UPDATE FILE

(75) Inventors: Matthew D. Singer, Hillsboro, OR (US); Robert J. Johnson, Hillsboro, OR (US); Nicholas J. Adams, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 128 days.

(21) Appl. No.: 10/728,184

(22) Filed: Dec. 4, 2003

(65) Prior Publication Data
US 2005/0125652 A1   Jun. 9, 2005

(51) Int. Cl.
   *G06F 15/177* (2006.01)
(52) U.S. Cl. .............. 713/2; 713/100; 710/8; 711/103
(58) Field of Classification Search .......... 713/2, 713/100; 710/8; 711/103
   See application file for complete search history.

(56) References Cited

U.S. PATENT DOCUMENTS

| | | | |
|---|---|---|---|
| 5,347,435 A | | 9/1994 | Smith et al. |
| 5,930,504 A | * | 7/1999 | Gabel ............................ 713/2 |
| 6,047,373 A | * | 4/2000 | Hall et al. ...................... 713/1 |
| 6,122,733 A | * | 9/2000 | Christeson et al. ............ 713/2 |
| 6,256,731 B1 | * | 7/2001 | Hall et al. ...................... 713/1 |
| 6,438,688 B1 | * | 8/2002 | Nunn ............................. 713/2 |
| 6,725,178 B1 | * | 4/2004 | Cheston et al. ............. 702/186 |
| 2002/0093829 A1 | | 7/2002 | Pinson et al. |
| 2004/0003265 A1 | * | 1/2004 | Freeman et al. ............ 713/191 |
| 2004/0030877 A1 | * | 2/2004 | Frid ............................... 713/1 |
| 2004/0221147 A1 | * | 11/2004 | Tseng et al. .................... 713/1 |
| 2005/0177709 A1 | * | 8/2005 | Kim ............................... 713/1 |

FOREIGN PATENT DOCUMENTS

| EP | 0 967 433 A2 | 12/1999 |
|---|---|---|
| WO | 00/55685 | 9/2000 |

* cited by examiner

*Primary Examiner*—Christopher Shin
(74) *Attorney, Agent, or Firm*—Fish & Richardson P.C.

(57) ABSTRACT

A system includes a processor, a memory including a basic input/output system (BIOS) in flash memory that includes digital signature verification, and a BIOS update installation process, and a medium containing a BIOS update file. The BIOS update file includes a signed data portion having a volume header, signed data and executable update code to configure the signed data with data in an unsigned data portion, and a digital signature.

29 Claims, 2 Drawing Sheets

BIOS UPDATE FILE

TECHNICAL FIELD

The present invention relates to a basic input/output system (BIOS) update file.

BACKGROUND

A basic input/output system (BIOS) is built-in software that determines what a computer can do without accessing programs from a disk. The BIOS contains all the code required to control, for example, a keyboard, a display screen, disk drives, serial communications, and to perform miscellaneous functions.

The BIOS is typically placed in a read only memory (ROM) chip that comes with the computer. Modern computers have a so-called flash BIOS, which means that the BIOS is recorded on a flash memory chip and can be modified using an update provided by, for example, an original equipment manufacturer (OEM), in a BIOS update file on a diskette.

Multiple BIOS update files are used to modify multiple flash memory modules in a system's flash BIOS. For example, a first BIOS update file can modify a core of a system's BIOS. A second BIOS update file can modify a company logo flash BIOS module. A third BIOS update file can modify a language flash BIOS module, e.g., English, with another language, e.g., French.

DETAILED DESCRIPTION

Figure 1:
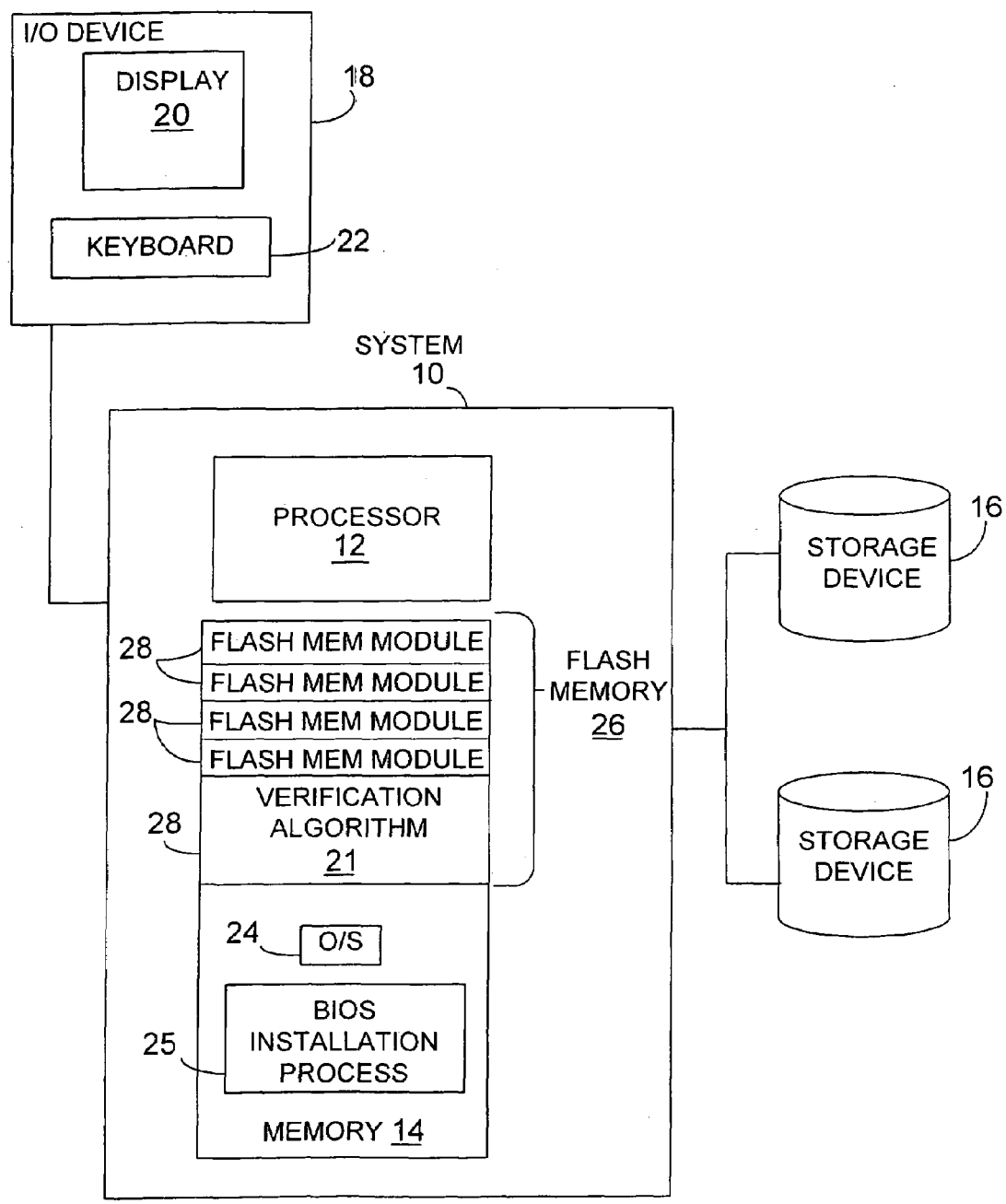
FIG. 1 is a block diagram.

As shown in FIG. 1, an exemplary third party computing system 10 includes a processor 12 and memory 14, manufactured by an original equipment manufacture (OEM), such as Intel Corporation. The system 10 also includes storage devices 16 and an input/output (I/O) device 18. Example storage devices 16 are disk drives and floppy drives. The I/O device 18 can include a display screen 20 and keyboard 22.

Memory 14 includes an operating system 24 such as Windows XP or Linux, a basic input/output operating system (BIOS) installation process 25 and a flash memory 26 containing the BIOS of system 10.

Flash memory (sometimes called "flash RAM") is a type of constantly-powered nonvolatile memory that can be erased and reprogrammed in units of memory called blocks. It is a variation of electrically erasable programmable read-only memory (EEPROM) which, unlike flash memory, is erased and rewritten at the byte level, which is slower than flash memory updating. Flash memory is often used to hold control code such as the basic input/output system (BIOS) in a personal computer. When BIOS needs to be changed (rewritten), the flash memory can be written to in block (rather than byte) sizes, making it easy to update.

Flash memory gets its name because a section of memory cells are erased in a single action or "flash." The erasure is caused by Fowler-Nordheim tunneling in which electrons pierce through a thin dielectric material to remove an electronic charge from a floating gate associated with each memory cell. Intel Corporation offers a form of flash memory that holds two bits (rather than one) in each memory cell, thus doubling the capacity of memory without a corresponding increase in price.

Flash memory 26 is organized into flash memory modules 28. Flash memory modules 28 contain the BIOS code required to control, for example, the storage devices 16, the display screen 20, the keyboard 22, serial communications (not shown), and to perform functions, respectively. The system 10 is assembled by a third party, such as Dell Computer Company, with hardware (e.g., storage devices 16 and serial communications) manufactured by other vendors. The third party relies on the OEM for keeping the BIOS current.

The BIOS installation process 25 is provided by the OEM and is used by the third party to install BIOS updates to the BIOS code in the flash memory modules 28 of the flash memory 26. The BIOS updates are secure data residing in a signed BIOS update file, described below, to insure data integrity and prevent misuse.

Figure 2:
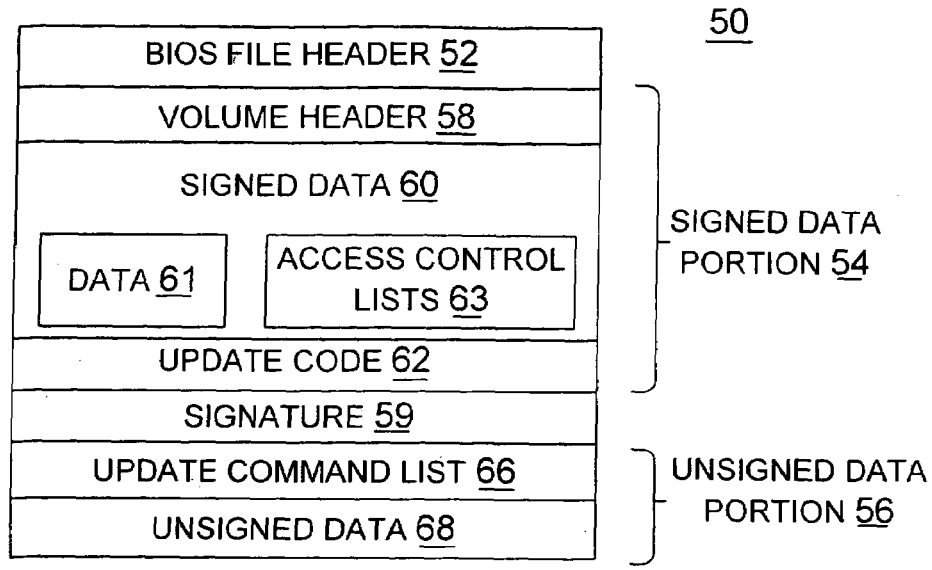
FIG. 2 is a block diagram.

As shown in FIG. 2, a BIOS update file 50 is generated in a secure fashion by an original equipment manufacturer (OEM), such as Intel Corporation, for installation in a flash memory of targeted hardware included in a third party's system, such as a system assembled by Dell Computer Company. The BIOS update file 50 includes a BIOS file header 52, a signed data portion 54, an unsigned data portion 56 and a signature 59.

The BIOS file header 52 includes interface data in conformance with an extensible firmware interface (EFI) specification. The EFI specification defines a model for an interface between operating systems and platform hardware. The interface includes data tables that contain platform-related information, plus boot and runtime service calls that are available to the operating system and its loader. Together, these provide a standard environment for booting an operating system and running pre-boot applications. The BIOS file header 52 also provides backward and forward compatibility to the BIOS update file 50.

The signed data portion 54 includes a volume header 58, signed data 60 and update code 62 (also referred to as a configuration utility). The volume header 58 contains a list of the locations of everything contained within the BIOS update file 50.

The signed data 60 includes a secure copy of the entire trusted BIOS update data 61 generated by the OEM along with an access control list 63. Portions of the data 61 can be included in or removed from a BIOS image to be inserted into the third party system, such as system 10, by an unauthenticated third party. This same access control list 63 is also embedded in the flash memory 26 of the targeted hardware of the third party's system 10 by the OEM and can be used by the OEM to control installation of different portions of a BIOS during BIOS updates.

The unauthenticated third party uses an OEM developed installation process to configure the data 61 using unsigned data contained in the unsigned data portion 56. The unauthenticated third party communicates with the update code 62 through a graphical user interface (GUI) of the installation process, which provides command and data structures in the unsigned data portion 56. The update code 62 uses the access control list 63 to enforce security rules regarding the types of configuration modifications permitted to the data 61 by the unauthenticated third party. The access control list 63 allows the unauthenticated third party an ability to add, modify and/or delete certain data 61 of the signed data 60 and insert their own data from the unsigned data portion 56 without the OEM losing confidence in the integrity of the signed data 60 that is eventually loaded into the flash memory modules 28 of system 10. For example, the unauthenticated third party can add their company logo or specify a specific language, such as French.

The update code 62 is executable code. The update code 62 processes commands and corresponding data to perform actual configuration modifications to the data 61 that becomes a final image that is placed into the flash memory modules 28 of the unauthenticated third party's system 10. Because the update code 62 is executable, new algorithms can be implemented by the OEM after initial loading of BIOS code in the flash memory modules 28.

The signature 59 is used to authenticate the BIOS update file 50. The signature 59 is verified against a verification algorithm 21 that is embedded in flash memory 26 prior to the flashing of the BIOS during the BIOS update installation process 25. In some implementations, the signature 59 uses public key/private key encryption and RSA algorithms.

The unsigned data portion 56 includes an update command list 66 and unsigned data 68. The list 66 includes instructions provided by the unauthenticated third party during execution of the update code 62 to modify the data 61, i.e., the unsigned data 68 is used in conjunction with the list 66 and replaces some of the data 61. The resulting BIOS update file 50 then includes all trusted BIOS data in a single, digitally signed BIOS update file 50. No other data files contained in other BIOS update files are necessary to change a configuration of BIOS code in the flash memory modules 28 of the unauthenticated third party's system 10. The update code 62 uses the BIOS update file 50 to generate an image that is written (flashed) into the flash memory modules 28. Multiple flash memory modules 28 can be updated by a single BIOS update file 50.

When the OEM initially generates the BIOS update file 50 it contains only the BIOS file header 52, the signed data portion 54, and an empty unsigned data portion 56. The unauthenticated third party, using the update code 62, adds unsigned data 68 to the unsigned data portion 56 and instructions/commands 66 on how data 68 in the unsigned data portion 56 should be used to modify some of the data 61. During the BIOS update installation process 25, the update code 62 replaces some of the data 61 with data 68 in the unsigned data portion 56 according to instructions 66 contained within the unsigned data portion 56. During the BIOS update installation process 25 and prior to any replacement of the data 61, instructions 66 contained in the unsigned data portion 56 are checked against a list of permitted instructions contained in the access control list 63.

Figure 3:
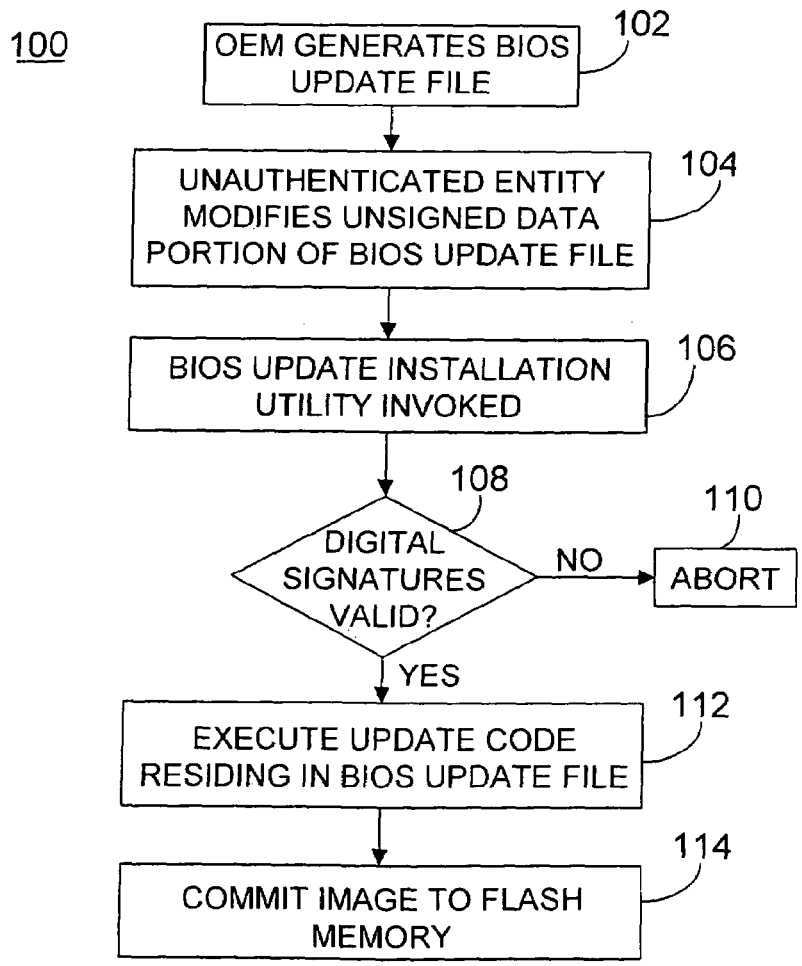
FIG. 3 is a flow diagram.

As shown in FIG. 3, a BIOS update process 100 includes an OEM generating (102) a secure BIOS update file. The secure BIOS update file includes a BIOS file header, a signed data portion including executable update code, a signature and an unsigned data portion. The unsigned data portion is empty. An unauthenticated third party configures (104) the unsigned portion of the BIOS update file using executable update code. Modifications include unauthenticated third party data and a list of instructions to be used in conjunction with the unauthenticated third party data.

BIOS update installation is invoked (106) by a BIOS update installation process residing in the memory of the third party system. The process 100 verifies (108) the digital signature in the BIOS update file against a signature embedded in the third party system's flash memory 26. If the digital signature verification fails, the process 100 aborts (110).

If the digital signature is verified, the update code residing in the signed data portion is executed (112). The update code processes any commands in the unsigned data area after verification of the commands against an access control list residing in the signed data portion. Commands that are not permitted are ignored.

When the update code terminates execution the resultant modified signed data portion is committed (114) as a trusted image to a flash memory of the third party's system.

Invoking (106) the BIOS installation process verifies the size of the incoming image relative to the amount of space available in the BIOS. A buffer is applied so that if the modules 28 with the current BIOS grow, future BIOS flashes will still have enough space to be able to work.

The BIOS update file 10 allows an unauthenticated third party that is not the OEM to selectively add, modify and/or remove BIOS components from the secure signed data portion 14 without OEM involvement and without the OEM losing trust in the resulting modified components. All trusted components are included in a single digitally signed BIOS update file 10. No other data files are necessary to change a configuration of a BIOS.

Other embodiments are within the scope of the following claims.

What is claimed is:

1. A basic input/output system (BIOS) update file comprising:
    a signed data area including a volume header, signed data, and executable update code;
    a signature; and
    an unsigned data area including an update command list and unsigned data.

2. The BIOS update file of claim 1 further comprising a file header.

3. The BIOS update file of claim 2 in which the file header comprises data in conformance with an extensible firmware interface (EFI) specification.

4. The BIOS update file of claim 1 in which the volume header comprises a list representing locations of components within the BIOS update file.

5. The BIOS update file of claim 1 in which the signed data area comprises:
    secure BIOS update data; and
    an access control list representing permitted commands.

6. The BIOS update file of claim 1 in which the executable update code comprises code to enforce security rules regarding types of modifications permitted to the signed data area.

7. The BIOS update file of claim 1 in which the update command list comprises commands requested by an unauthenticated entity for modifications of the signed data.

8. A method comprising:
    executing update code in a basic input/output system (BIOS) update file to modify data in an unsigned data portion and add commands relating to the data;
    verifying a digital signature of the BIOS update file;
    executing the update code for processing the commands in the unsigned data portion affecting data in a signed data portion; and
    committing the BIOS update file.

9. The method of claim 8 in which the unsigned data portion comprises unauthenticated data.

10. The method of claim 8 in which verifying comprising aborting upon occurrence of verification failure.

11. The method of claim 8 in which executing the update code for processing the commands comprises:
    verifying the commands against an access control list; and
    in response to the verifying, modifying the signed data portion with the data in the unsigned data portion.

12. A computer program product, tangibly embodied in an information carrier, for updating a flash memory basic input/output system (BIOS), the computer program product being operable to cause data processing apparatus to:
  execute update code in a BIOS update file to modify data in an unsigned data portion and add commands relating to the data;
  verify a digital signature of the BIOS update file;
  execute the update code for processing commands in the unsigned data portion affecting data in a signed data portion; and
  commit the BIOS update file.

13. The product of claim 12 in which the unsigned data portion comprises unauthenticated data.

14. The product of claim 12 in which verifying comprises aborting upon occurrence of verification failure.

15. The product of claim 12 in which executing the update code for processing commands causes the data processing apparatus to:
  verify the commands against an access control list; and
  in response to the verifying, modify the signed data portion with the unsigned data portion.

16. A method comprising:
  adding data to an unsigned data portion of a basic input/output system (BIOS) update file;
  adding commands to the unsigned data portion of the BIOS update file;
  verifying a signature in the BIOS update file with a signature residing in target hardware;
  verifying the commands against an access control lost residing in a signed data portion of the BIOS update file; and
  modifying data in the signed data portion of the BIOS update file with data in the unsigned portion in response to the commands.

17. The method of claim 16 in which the commands comprise:
  a command to add data in the unsigned data portion to data in the signed data portion;
  a command to modify data in the signed data portion with data in the unsigned data portion; and
  a command to delete data in the signed data portion.

18. The method of claim 16 in which verifying the signature in the BIOS update file with the signature in the target hardware comprises a public key/private key encryption process.

19. The method of claim 18 in which the public key/private key encryption process is an RSA encryption process.

20. The method of claim 16 further comprising generating an image for the data in the signed data portion.

21. The method of claim 20 further comprising flashing the image into flash memory of target hardware.

22. The method of claim 21 in which the flash memory comprises flash memory modules.

23. A computer program product, tangibly embodied in an information carrier, the computer program product being operable to cause data processing apparatus to:
  add data to an unsigned data portion of a basic input/output system (BIOS) update file;
  add commands to the unsigned data portion;
  verify a signature in the BIOS update file with a signature in target hardware;
  verify the commands against an access control list (ACL) residing in a signed portion of the BIOS update file; and
  modify data in the signed portion with data in the signed portion in response to the commands.

24. The product of claim 23 in which the commands comprise:
  a command to add data from the unsigned data portion to data in the signed data portion;
  a command to modify data in the signed data portion with data in the unsigned data portion; and
  a command to delete data in the signed data portion.

25. The product of claim 23 further causing the processor to:
  generate an image for the data in the signed data portion.

26. The product of claim 25 further causing the processor to:
  flash the image into a flash memory pf the target hardware.

27. A system comprising:
  a processor;
  a memory including a basic input/output system (BIOS) installation process, and a flash memory containing a BIOS with digital signature verification;
  a medium containing a BIOS update file, the BIOS update file comprising:
    a signed data portion including a volume header, signed data and executable update code to configure the signed data with unsigned data in an unsigned data portion; and
    a digital signature.

28. The system of claim 27 in which the BIOS update file further comprise:
  an access control list having authorized commands in the signed data portion; and
  a list of commands in unsigned data portion.

29. The system of claim 28 in which the authorized commands comprise commands to enforce security rules regarding types of modifications permitted to the signed data.

* * * * *